(12) United States Patent
Tabib-Azar (10) Patent No.: US 12,540,915 B2
(45) Date of Patent: Feb. 3, 2026

(54) MICRO-BALANCE BIOSENSORS TO DETECT WHOLE VIRUSES

(71) Applicant: University of Utah Research Foundation, Salt Lake City, UT (US)

(72) Inventor: Massood Tabib-Azar, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 887 days.

(21) Appl. No.: 17/771,653

(22) PCT Filed: Oct. 23, 2020

(86) PCT No.: PCT/US2020/057190
§ 371 (c)(1),
(2) Date: Apr. 25, 2022

(87) PCT Pub. No.: WO2021/081424
PCT Pub. Date: Apr. 29, 2021

(65) Prior Publication Data
US 2022/0373542 A1 Nov. 24, 2022

Related U.S. Application Data

(60) Provisional application No. 63/021,605, filed on May 7, 2020, provisional application No. 62/926,376, filed on Oct. 25, 2019.

(51) Int. Cl.
*G01N 27/414* (2006.01)
*G01N 15/06* (2006.01)
(Continued)

(52) U.S. Cl.
CPC ..... *G01N 27/4145* (2013.01); *G01N 15/0637* (2013.01); *G01N 27/4146* (2013.01);
(Continued)

(58) Field of Classification Search
CPC .......... G01N 27/4145; G01N 27/4146; G01N 27/3278; G01N 15/0637; G01N 15/01;
(Continued)

(56) References Cited

U.S. PATENT DOCUMENTS

| 6,458,327 B1 | 10/2002 | Vossmeyer |
| 6,515,325 B1 | 2/2003 | Farnworth et al. |

(Continued)

FOREIGN PATENT DOCUMENTS

| EP | 3537138 | 9/2019 |
| JP | 2009156827 | 7/2009 |

(Continued)

OTHER PUBLICATIONS

Basu et al.; "Microelectromechanical Resonators for Radio Frequency Communication Applications:" Microsystem Technologies; (Oct. 2011); pp. 1557-1580; vol. 17, No. 10-11; <doi: 10.1007/s00542-011-1332-9 >.

(Continued)

*Primary Examiner* — Michael L Hobbs
(74) *Attorney, Agent, or Firm* — Thorpe North & Western, LLP (57) ABSTRACT

The present disclosure describes methods of detecting viral biomolecules such as viruses through frequency response. A method (200) of detecting a vims includes exposing (210) a sensor surface to a fluid sample containing a suspected virus. The sensor surface can be a surface of a resonator having a clean resonant frequency from about 1 MHz to about 1 GHz. The surface can be modified with molecular recognition groups selective for binding to the viral biomolecule. A resonant frequency of the resonator can be measured (220) after exposing the sensor surface to the fluid sample. The measured resonant frequency can be compared (230) with a clean resonant frequency indicating the presence of the viral (Continued)

biomolecule bound to the molecular recognition groups and then outputted (240) as a detection signal.

19 Claims, 10 Drawing Sheets

(51) Int. Cl.
| | |
|---|---|
| *G01N 33/543* | (2006.01) |
| *G01N 33/569* | (2006.01) |
| *G06N 20/00* | (2019.01) |
| *G16H 50/20* | (2018.01) |
| *G01N 15/01* | (2024.01) |

(52) U.S. Cl.
CPC ... *G01N 33/54373* (2013.01); *G01N 33/5438* (2013.01); *G01N 33/56983* (2013.01); *G06N 20/00* (2019.01); *G16H 50/20* (2018.01); *G01N 15/01* (2024.01); *G01N 2333/165* (2013.01); *G01N 2333/185* (2013.01)

(58) Field of Classification Search
CPC ......... G01N 33/54373; G01N 33/5438; G01N 33/56983; G01N 233/165; G01N 233/185; G06N 20/00; G16H 50/20
See application file for complete search history.

(56) References Cited

U.S. PATENT DOCUMENTS

| | | | |
|---|---|---|---|
| 8,709,791 B2 | 4/2014 | Larson et al. | |
| 10,426,857 B2 | 10/2019 | Boyden et al. | |
| 10,545,161 B2 | 1/2020 | Khattak et al. | |
| 2005/0116263 A1* | 6/2005 | Lu ................ | G01N 27/4146 257/252 |
| 2008/0160638 A1* | 7/2008 | Lederman ........ | G01N 33/54373 430/296 |
| 2009/0235746 A1 | 9/2009 | Mutharasan et al. | |
| 2009/0273354 A1* | 11/2009 | Dhirani ............. | G01N 30/64 324/663 |
| 2010/0135854 A1 | 6/2010 | Yang et al. | |
| 2011/0053139 A1* | 3/2011 | Larson ............. | G01N 33/54373 435/5 |
| 2012/0196384 A1 | 8/2012 | Zhang et al. | |
| 2013/0273522 A1 | 10/2013 | Lowery, Jr. et al. | |
| 2014/0162893 A1 | 6/2014 | Cash et al. | |
| 2017/0015667 A1 | 1/2017 | Bowman et al. | |
| 2017/0052174 A1* | 2/2017 | Branch ............. | B01L 3/502715 |
| 2017/0154164 A9 | 6/2017 | Levinson et al. | |
| 2017/0168000 A1 | 6/2017 | Ichiki | |
| 2017/0263874 A1 | 9/2017 | Isogai et al. | |
| 2017/0350856 A1 | 12/2017 | Kobayashi et al. | |
| 2018/0003712 A1 | 1/2018 | Haam et al. | |
| 2018/0108440 A1 | 4/2018 | Stevens et al. | |
| 2018/0275028 A1 | 9/2018 | Saito et al. | |
| 2019/0004003 A1 | 1/2019 | Merriman et al. | |
| 2019/0034565 A1 | 1/2019 | Varughese | |
| 2019/0128853 A1 | 5/2019 | Wright | |
| 2019/0232282 A1 | 8/2019 | Pierson et al. | |
| 2021/0117636 A1 | 4/2021 | Lin et al. | |

FOREIGN PATENT DOCUMENTS

| | | |
|---|---|---|
| KR | 20100063598 | 6/2010 |
| KR | 1020190013454 | 2/2019 |
| WO | WO 2005/043126 A2 | 5/2005 |
| WO | WO 2015/088446 A1 | 6/2015 |
| WO | WO 2017/180745 A1 | 10/2017 |

OTHER PUBLICATIONS

Cesewski et al.; "Electrochemical Biosensors for Pathogen Detection;" Biosensors and Bioelectronics; (2020); 29 pages; vol. 159; <doi: 10.1016/j.bioe.2020.112214 >.

Di Iorio; "Designer Surfaces for the Quantification of Multivalent Biological Interactions;" [Dissertation]; PhD at the University of Twente; (2019); 179 pages; <doi: 10.3990/1.9789036548199 >.

Dolai et al.; "Terahertz Detection of Zika Viruses;" Preprints.org; (Feb. 17, 2020); 7 pages; <doi: 10.20944/preprints202002.0232. v1 >.

Ilgu et al.; "Aptamers for Diagnostics with Applications for Infectious Diseases;" Recent Advances in Analytical Chemistry; IntechOpen; (2019); 32 pages; <doi: http://dx.doi.org/10.5772/intechopen. 84867 >.

Krejcova et al.; "Nanoscale Virus Biosensors: State of the Art;" Nanobiosensors in Disease Diagnosis; (2015); pp. 47-66; vol. 4; <doi: 10.2147/NDD.S56771 >.

Kuitio et al. "Aptamer-Based QCM-Sensor for Rapid Detection of PRRS Virus;" Proceedings; (2018); 4 pages; vol. 2, No. 1038; <doi: 10.3390/proceedings2131038 >.

Lang et al.; "Cantilever Array Sensors;" Materials Today; (Apr. 2005); pp. 30-36; vol. 8, Issue 4; <doi: 10.1016/S1369-7021(05)00792-3 >.

Namhil et al.; "A Label-Free Aptamer-Based Nanogap Capacitive Biosensor with Greatly Diminished Electrode Polarization Effects;" Physical Chemistry Chemical Physics; (2018); 25 pages; <doi: 10.1039/C8CP05510F >.

Ravina et al.; "Detection Methods for Influenza A H1N1 Virus with Special Reference to Biosensors: A Review;" Bioscience Reports; (2020); 40 pages; vol. 40, No. BSR20193852; <doi: 10.1042/BSR20193852 >.

Saylan et al.; "An Alternative Medical Diagnosis Method: Biosensors for Virus Detection;" Biosensors; (2019); 22 pages; vol. 9, No. 65; <doi: 10.3390/bios9020065 >.

Van Den Kieboom et al.; "Aptasensors for Viral Diagnostics;" Trends in Analytical Chemistry; (2015); pp. 58-67; vol. 74; <doi: 10.1016/j.trac.2015.05.012 >.

Zou et al.; "Application of Aptamers in Virus Detection and Antiviral Therapy;" Frontiers in Microbiology; (Jul. 3, 2019); 20 pages; vol. 10, Article 1462; <doi: 10.3389/fmicb.2019.01462 >.

Dolai et al., Zika Virus Field Effect Transistor; IEEE Sensors Journal, vol. 21, No. 4, Feb. 15, 2021, pp. 4122-4128.

Kasap et al., Biosensors Based on Nano-Gold/Zeolite-Modified Ion Selective Field-Effect Transistors for Creatinine Detection, Nanoscale Research Letters, DOI 10.1186/s11671-017-1943-x, 2017, 11 pages.

Tsai et al., Electrical detection of DNA hybridization with multilayer gold nanoparticles between nanogap electrodes, Microsystem Technologies 11 (2005), DOI 10.1007/s00542-004-0436-x, pp. 91-96.

Kim et al., An Underlap Channel-Embedded Field-Effect Transistor for Biosensor Application in Watery and Dry Environment, IEEE Transactions on Nanotechnology, vol. 11, No. 2, 2012, pp. 390-394.

Yang et al., Zika virus detection using antibody-immobilized disposable cover glass and AlGaN/GaN high electron mobility transistors, Applied Physics Letters, Research Article, 2018, 6 pages.

* cited by examiner

MICRO-BALANCE BIOSENSORS TO DETECT WHOLE VIRUSES

RELATED APPLICATION

This application claims priority to U.S. Provisional Application No. 62/926,376 filed Oct. 25, 2019 and U.S. Provisional Application No. 63/021,605 filed May 7, 2020, which are each incorporated herein by reference.

This invention was made with government support under 1931100 awarded by the National Science Foundation. The government has certain rights in the invention.

BACKGROUND

Various viruses pose a great threat to populations around the world and can lead to pandemic when virus spread is uncontrolled. For example, the SARS-CoV-2 virus has recently caused a worldwide pandemic. This virus is very contagious and has spread quickly. The virus is also capable of being transmitted from infected individuals before the individuals experience symptoms, and some individuals may remain asymptomatic. Therefore, preventing the spread of this virus has been difficult. The Zika virus (ZIKV) is another example of a virus that has spread with severe consequences. This virus can spread from a pregnant woman to the fetus to cause birth defects such as microcephaly and other congenital abnormalities. The virus can also cause Guillain-Barré syndrome, neuropathy and myelitis in adults. Early detection of these viruses can be very helpful to control the spread of the viruses and help reduce infection rates. Detection methods for different viruses can vary. Some example detection methods that have been used include serum analysis with viral RNA or antibody-based detection assays, polymerase chain reaction-based (PCR) assays, and others. In many cases, these tests can provide useful results but the tests may require expensive and specialized laboratory equipment and procedures, and some tests can have long wait times before results are available.

SUMMARY

The present disclosure is drawn to micro-balance based sensors that can detect whole viruses through a frequency response. In one example, a method of detecting a virus can include exposing a sensor surface to a fluid sample containing a suspected virus. The sensor surface can be a surface of a resonator having a resonant frequency from about 1 MHz to about 1 GHz before mass-loading and viral biomolecule attachment. The resonator can be a piezoelectric resonator (e.g. a quartz crystal microbalance) or it can be a microelectromechanical resonator. The surface of these resonators can be modified with molecular recognition groups selective for binding to the virus or other viral biomolecules (e.g. antigens, antibodies, etc). A resonant frequency of the resonator can be measured after exposing the sensor surface to the fluid sample. The resonant frequency of these devices changes when mass is added to their surfaces. As such, the change in the measured resonant frequency before and after the virus/pathogen is used to detect and quantify the amount of added mass due to viruses or pathogens.

Additional features and advantages of these principles will be apparent from the following detailed description, which illustrates, by way of example, features of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a layer" includes reference to one or more of such structures, "a metal" includes reference to one or more of such materials, and "a measuring step" refers to one or more of such steps.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property. The term "about" is not intended to either expand or limit the degree of equivalents which may otherwise be afforded a particular value. Further, unless otherwise stated, the term "about" shall expressly include "exactly," consistent with the discussion below regarding ranges and numerical data. However, unless otherwise enunciated, the term "about" generally connotes flexibility of less than 2%, most often less than 1%, and in some cases less than 0.01%.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Molecular Recognition Groups for Binding Viral Biomolecules

The present technology includes a variety of sensors that can detect viral biomolecules based on a unique signature frequency response. The various ways in which frequency responses are used in these sensors are described in more detail below. In some examples, any of the sensors described herein can incorporate aptamers or other molecular recognition groups for selectively binding a target virus.

Viral biomolecules can be any chemical entity which is directly or indirectly related to the presence of viruses by indicating a current or previous infection with the virus. Non-limiting examples of viral biomolecules can include whole virus, antibodies, antigens, viral proteins, viral RNA, viral DNA, viral biomarkers, and the like.

Molecular recognition groups can be any chemical compound or group that selectively binds with the target virus. Non-limiting examples of molecular recognition groups can include aptamers, antigens, antibodies, and the like.

Aptamers are molecules that are capable of selectively binding to specific viruses. In some examples, aptamers can be oligonucleotides that can bind to specific sites on a virus. Aptamers can be highly specific. Unlike antigens, which often deteriorate over time, aptamers can remain viable almost indefinitely at room temperature storage. In some examples, when an aptamer binds to a target, the charge content of the aptamer can shift and the configuration of the aptamer can change. These changes and other changes associated with the aptamer binding to a target can be monitored to detect the binding between the aptamer and the target. Accordingly, when an aptamer that specifically binds to a target virus is used, the presence of the virus can be detected by monitoring binding of the aptamer to the virus.

Aptamers can be made artificially and designed specifically to bind to a particular target. In one example, aptamers for binding to Zika virus can be obtained from BasePair Biotechnologies Inc. Aptamers can be obtained for any target virus using the SELEX process (Sequential Evolution of Ligands by Exponential Enrichment) or other similar processes capable of producing aptamers (e.g. modified SELEX, SELCOS, MAWS, JAWS, etc.). In this process, a large library of oligonucleotides can be tested to find oligonucleotides that bind to a target. The targets can include proteins, peptides, carbohydrates, small molecules, toxins, or cells.

In the sensors described herein, aptamers targeting a specific virus can be immobilized on a sensor surface. Molecular recognition groups can generally include a surface bonding group and a virus or other viral biomolecule binding group. Metal surfaces can be bonded with aptamers, antigens, antibodies, or other molecular recognition groups using any suitable functionalization technique. Further, metal surfaces can optionally be first prepared or activated via functionalization with an active group which binds with a corresponding end of the molecular recognition group. For example, a thiol group can be attached to the metal surface. However, in many cases, the molecular recognition group can include a surface bonding group which directly bonds to the metal surface. Non-limiting examples of surface bonding groups can include organosulfur thiols such as alkyl thiols, dialkyl disulfides, etc. Metal, e.g. gold, surface can also be functionalized via techniques such as, but not limited to, oligonucleotide functionalization via thiol groups, surface saturation with single stranded oligonucleotides, PEGylation optionally including thiol or azide bonding groups, photonic immobilization, azide functionalization, and the like. For some details on the known synthetic functionalization techniques, see INNOVACOAT Gold coatings; Polo E. et al. (2013) *Tips for the Functionalization of Nanoparticles with Antibodies*. In: Guisan J. (eds) Immobilization of Enzymes and Cells. Methods in Molecular Biology (Methods and Protocols), vol 1051. Humana Press, Totowa, NJ pp. 149-163; Tiwari et al. Nanomaterials 2011, 1(1), 31-63, *Functionalized Gold Nanoparticles and Their Biomedical Applications*; which are each incorporated herein by reference. For example, thiols can be functionalized at one or both ends of an aptamer, an antigen, or an antibody.

In a specific example, the aptamers can include a thiol end group configured to bind with gold electrodes. Thiol end groups bind with almost any materials. Thiol end groups are very aggressive and in some cases may cause corrosion of some metallic surfaces. In those cases other functional end groups with lower binding energies can be used such as, but not limited to, metal-carbon (e.g. carbene, acetylide, vinylidene, etc), metal-nitrogen (e.g. nitrene, etc), azides, and the like.

Formation of a layer of molecular recognition groups can be performed using liquid phase deposition. A molecular recognition group (e.g. aptamer) solution can be applied to the surface in order to bond with the surface. The functionalized group can then react with the exposed surface to bind the molecular recognition groups to the surface. Residual unreacted materials can be removed by washing or evaporation.

The sensor surface can then be exposed to a sample fluid that is suspected to contain the virus. Because the viral biomolecules such as aptamers can bind specifically with the target virus or other viral biomolecule, the target viral biomolecule can selectively adhere to the molecular recognition group-coated surface. In some examples, aptamers having a linking group, such as a thiol linking group, can be used. The linking group can bond to the sensor surface. Thiol linking groups can covalently bond to a gold surface or almost any other type of metal surface. Accordingly, in some examples, the sensor surface can include a layer of metal such as gold for the aptamers to bond to. In various examples, a metal layer can be formed on a sensor surface using methods such as photoetching, electroplating, electroless plating, physical vapor deposition, and others.

Figure 1:
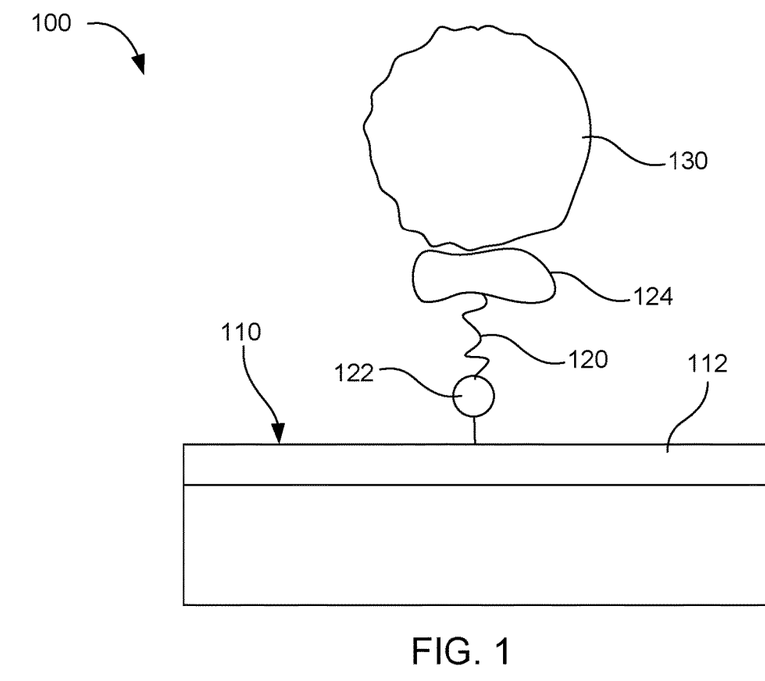
FIG. 1 is a schematic of an example sensor in accordance with an example of the present disclosure.

FIG. 1 shows a simplified example sensor 100 including a sensor surface 110 having a gold layer 112 and an aptamer 120 immobilized on the sensor surface. The gold layer 112 can be deposited on any suitable substrate material which is not particularly limited, depending on the specific device criteria. In this example, the aptamer includes a sulfur linking group 122 bonded to the gold surface. The aptamer also includes a target binding portion 124 that selectively binds to a target virus 130. In this particular example, the target virus depicted is a Zika virus and the target binding portion of the aptamer is cDNA to the SF9 protein. The aptamer binds to the capsid protein of the Zika virus. Although aptamer-virus binding is illustrated, the same principle applies for other viral biomolecules and corresponding molecular recognition groups.

Sensors to Detect Viruses Through Resonant Frequency

One method of detecting viruses disclosed herein can involve a resonator that can have a measurable resonant frequency that changes in response to the present of a target virus. In one example, a biosensor can include a piezoelectric resonator having a resonant frequency. A surface of the resonator can be modified with aptamers that are selective for binding to a target virus. When the target virus binds to the aptamer, the resonant frequency of the piezoelectric resonator can change due to the increase in mass from the addition of the virus. Because the aptamers can bind specifically with the target virus and not with other materials, a change in the resonant frequency can accurately indicate the presence of the target virus.

The resonant frequency of the piezoelectric resonator without the virus attached can be defined as the "clean" resonant frequency of the resonator. After exposing the aptamer-modified surface of the sensor to a sample fluid, the resonant frequency can be measured again. In some examples, a sample fluid that is known to contain the target virus can be applied to the sensor surface and the resonant frequency can be measured to determine a resonant frequency that indicates the presence of the target virus bound to the aptamers. This serves as a baseline reference. When the sensor is used to test unknown sample fluids, the measured resonant frequency can be compared to this known resonant frequency to determine whether the target virus is present or not. In some examples, the added mass of the target virus can cause the resonant frequency of the resonator to decrease.

In some cases, using a piezoelectric resonator with a relatively high clean resonant frequency can be useful. It has been found that piezoelectric resonators having a relatively high resonant frequency, such as in the range of about 375 MHz to about 500 MHz, can detect target viruses with high sensitivity, although frequencies from about 1 MHz to 1 GHz can also be used. The sensitivity of these sensors can be defined in units of Hz/ng of virus, meaning the number of Hz in the difference between the clean resonant frequency and the resonant frequency after binding to the target virus. Piezoelectric resonators with resonant frequencies in the above range can have a large change in resonant frequency when target viruses are attached. In some examples, the sensitivity of the sensors can be 100 Hz/ng of virus or more, or 200 Hz/ng of virus or more. In certain examples, the sensitivity can be from about 200 Hz/ng of virus to about 600 Hz/ng of virus.

Figure 2:
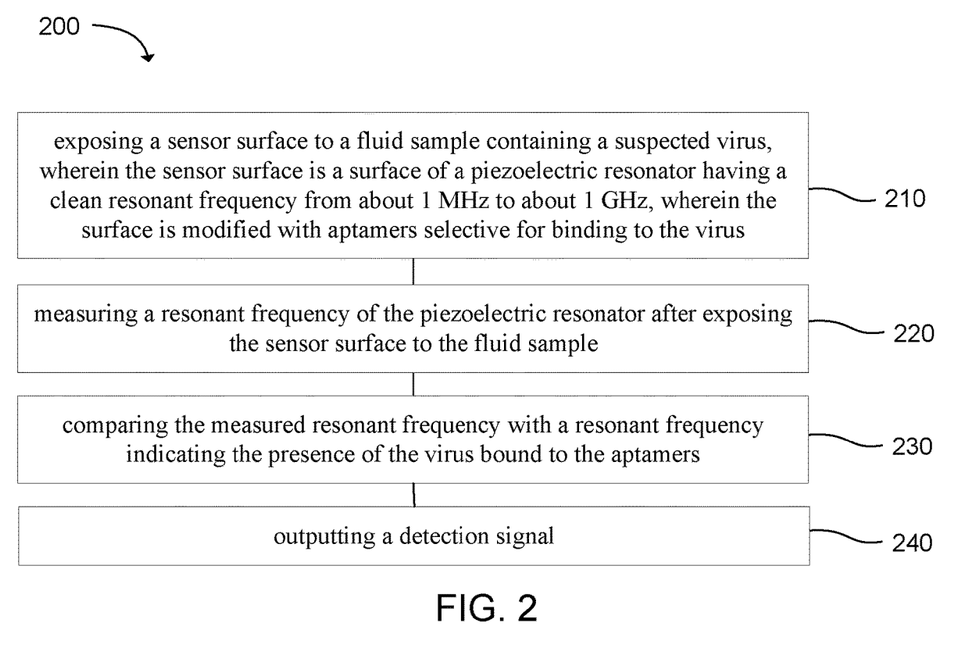
FIG. 2 is a flowchart illustrating an example method of detecting a viral biomolecule in accordance with an example of the present disclosure.

With this description in mind, FIG. 2 is a flowchart illustrating one example method 200 of detecting a virus. This method includes: exposing 210 a sensor surface to a fluid sample containing a suspected virus, wherein the sensor surface is a surface of a piezoelectric resonator having a clean resonant frequency from about 375 MHz to about 500 MHz, wherein the surface is modified with aptamers selective for binding to the virus; measuring 220 a resonant frequency of the piezoelectric resonator after exposing the sensor surface to the fluid sample; comparing 230 the measured resonant frequency with a resonant frequency indicating the presence of the virus bound to the aptamers; and outputting 240 a detection signal.

In various examples, the fluid sample can be any fluid that is suspected to contain a target virus. The fluid sample can be a liquid or gas. In certain examples, the fluid sample can be ambient air, exhaled air, bodily fluids such as blood, saliva, mucus, urine, etc, aqueous solutions, liquids containing tissue samples such as trachea samples, skin samples, mucus membrane samples, and others. The fluid samples can be used directly or may be diluted in an appropriate solution prior to application to the sensor. The fluid sample can be applied to the surface of the sensor using any suitable application method, such as dropping a liquid sample with an eyedropper, flowing a liquid sample across the surface using a microfluidic system, submerging the sensor in a liquid sample, exposing the sensor surface to ambient air, blowing a gaseous sample across the sensor surface using a blower, blowing an exhaled breath sample across the sensor surface under breath power, and so on.

The piezoelectric resonator can be a material that can generate mechanical energy in response to an applied electric current. The piezoelectric resonator can also have a resonant frequency in the range of from about 1 MHz to about 1 GHz. In certain examples, the piezoelectric resonator can have a resonant frequency from about 430 MHz to about 440 MHz. In still further examples, the piezoelectric resonator can have a resonant frequency from about 433 MHz to about 434 MHz. In some examples, the piezoelectric resonator can include a lithium niobate ($LiNbO_3$) crystal. There are many piezoelectric crystals including quartz and $LiNbO_3$ that can be used in these devices. A notable example is aluminum nitride. In one example, a lithium niobate crystal can have a resonant frequency of about 433 MHz prior to bonding with the aptamer or other molecular recognition group. The resonant frequency changes and is reduced by mass-loading when viruses bound to the surface of the lithium niobate resonator.

Figure 3A:
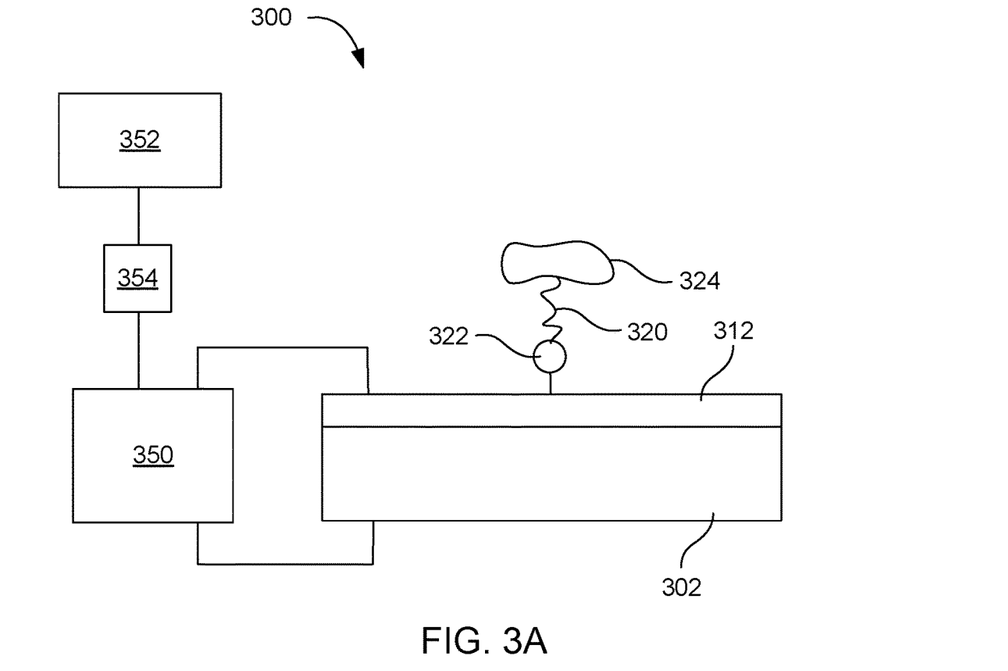
FIGS. 3A-3E are schematics of example biosensors involving a resonator in accordance with an example of the present disclosure.
Figure 3B:
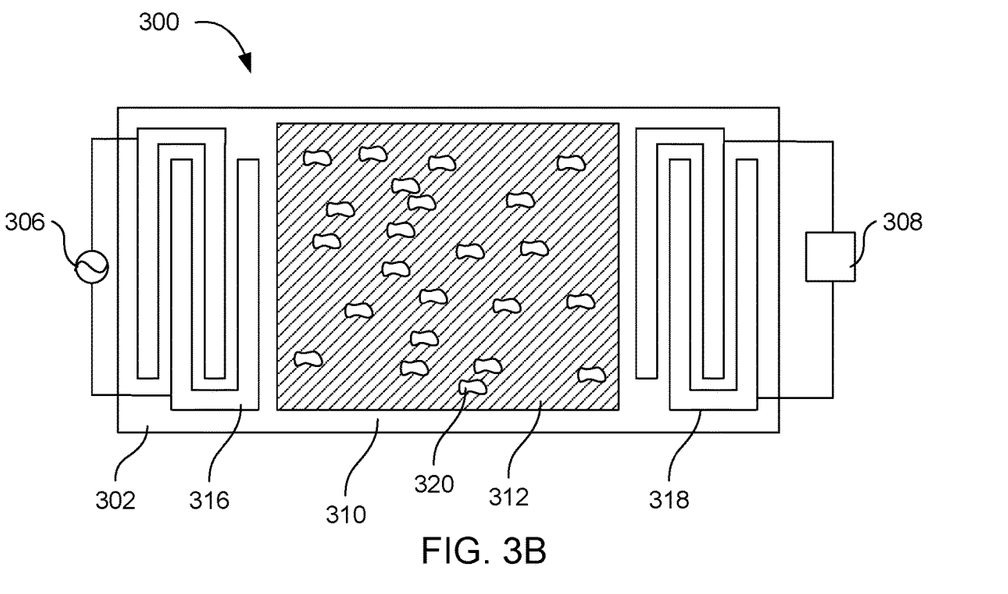
Figure 3C:
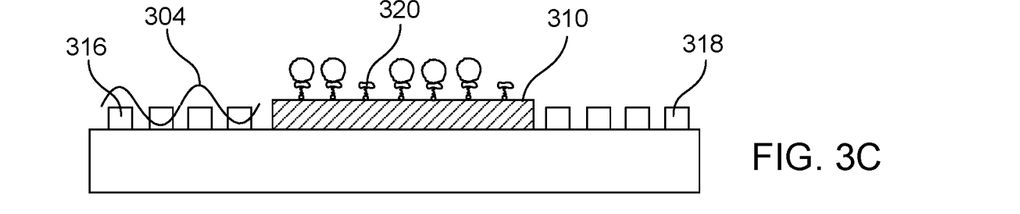
Figure 3D:
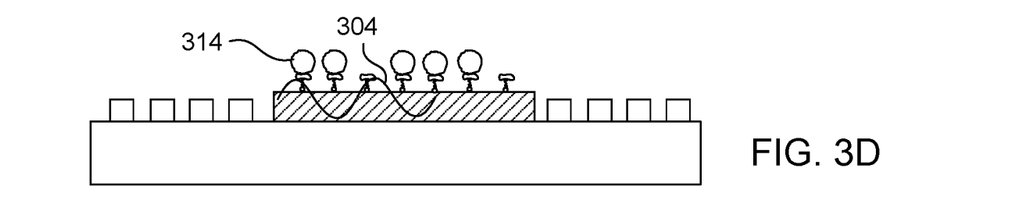
Figure 3E:
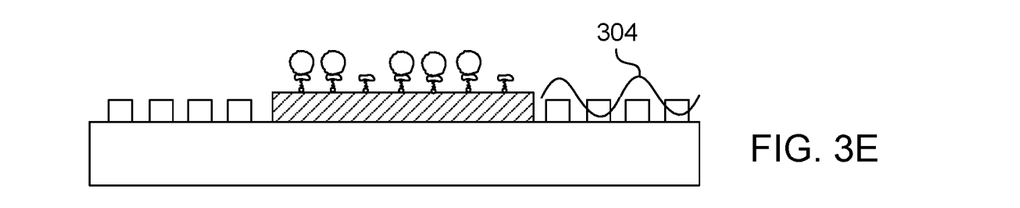

More generally, other quartz crystal resonators can be used, although many quartz crystal resonators have a lower resonant frequency. This type of resonator has been used in quartz crystal microbalances (QCM), which can measure mass loading from a virus binding to a surface of the microbalance. When an alternating electric filed is applied, the inner dipole in the quartz crystal causes mechanical strain producing ultrasonic waves, which results in the crystal vibrating at a resonant frequency. The resonant frequency can change when mass is added to the surface of the crystal. The sensitivity is described by the Sauerbrey equation where the change in mass Δm on a certain area A can be calculated from $\Delta m/A=\Delta f_n(\rho_q\mu_q)^{0.5}/(-2nf_l^2)$, where $\Delta f_n$ is the change in resonant frequency, $\rho_q$ is the density of quartz and $\mu_q$ is the shear modulus of quartz. AT-cut quartz is often used because of its favorable temperature coefficient (3 ppm/(−10° C. to +40° C.)) and its ability to operate in liquids because of its shear-mode vibration.

In some examples, the resonant frequency can change when viruses bind to aptamers on the surface of the piezoelectric resonator. In many examples, the resonant frequency can decrease when viruses bind to the aptamers. Therefore, in some examples, a decrease in the resonant frequency can indicate the presence of the target virus. In certain examples, a decrease in the resonant frequency that is greater than a certain threshold value can indicate the presence of the target virus. In other examples, a resonant frequency with the virus present on the surface can be pre-measured and this resonant frequency can be used as a threshold to determine when the sensor is exposed to sample fluids that contain the target virus. For example, if the measured resonant frequency of the piezoelectric resonator is below the threshold value, then the result can be considered "positive" for the presence of the target virus.

The methods can also include calculating an amount of the target virus present in the sample fluid or present on the aptamer-modifier surface of the sensor. In some examples, a correlation can be developed that can allow the amount of virus present to be calculated based on the measured resonant frequency of the piezoelectric resonator. As an example, a series of sample fluids having multiple different known concentrations of the target virus can be applied to the sensor surface, and the resonant frequency of the piezoelectric resonator can then be measured. The resonant frequencies can be correlated to the concentration of virus in the sample fluids. In other examples, different methods can be used to measure the amount of target virus that is present on the sensor surface, such as direct observation with a microscope. If the amount of virus bound to the sensor surface is known, then the measured resonant frequency of the piezoelectric resonator can be correlated to the amount of virus. This correlation can then be used in future tests when the sensor is used to detect the target virus in unknown sample fluids.

Measurement of the resonant frequency of the piezoelectric resonator can be accomplished using a network analyzer, such as an Agilent™ 4395A Network Analyzer, available from Agilent (USA). Network analyzers are complex instruments that are capable of applying an alternating current to the piezoelectric resonator and measuring the vibration magnitude of the piezoelectric resonator, among many other functions. In some examples, a network analyzer can be used to measure spectrum data of the piezoelectric resonator across a particular span of frequencies. For example, the network analyzer can be used to measure data over a range that encompasses the clean resonant frequency of the piezoelectric resonator. The range can be, in some examples, from about 1 MHz less than the clean resonant frequency to about 1 MHz above the clean resonant frequency. In other examples, the range can be from about 500 kHz less than the clean resonant frequency to about 500 kHz above the clean resonant frequency. In still other examples, the range can be from about 400 kHz less than the clean resonant frequency to about 400 kHz above the clean resonant frequency. The actual resonant frequency of the piezoelectric resonator can be found from the spectrum data.

The methods of detecting viruses can also include outputting a detection signal. The detection signal can be in a variety of forms, including a signal indicating the presence the target virus, a signal indicating the absence of the target virus, a signal indicating an amount of the target virus that is present, a signal indicating a data point such as a measured resonant frequency of the piezoelectric resonator, or another signal related to the detection of the target virus. In various examples, the signal can be an electronic signal that is receivable by a computer, an auditory signal that can be heard by a human user, a visual signal such as a light or an image or text displayed on a display screen, or another type of signal. In a certain example, the detection signal can be a spectrum showing measured spectrum data for the piezoelectric resonator. A human user with appropriate training can read the spectrum data and compare the spectrum data to a spectrum of a clean piezoelectric resonator or to a spectrum of a resonator with the target virus attached, and the human user can determine based on the comparison whether the target virus was present on the sensor surface or not. In other examples, a computer can compare these types of spectrum data and the computer can determine whether the target virus is present and then the computer can output a signal to a human user to indicate whether the target virus is present or not. Any suitable combination of human and computer or electronic devices can be used in these methods for measuring resonant frequencies, comparing resonant frequencies and/or comparing spectrum data, and output detection signals.

FIG. 3A shows an example biosensor 300 that can detect a target virus using the methods described above. The biosensor of this example includes a piezoelectric resonator 302 with a gold coating 312 on a surface thereof. An aptamer 320 is bonded to the gold coating through sulfur linking groups 322. Notably this illustration includes a single aptamer for clarity in illustration, although typically dozens or hundreds of aptamers will be bonded to a surface depending on sensor size. The aptamers include a target binding portion 324 that can selectively bind to the target virus. The piezoelectric resonator is connected to a network analyzer 350. The network analyzer can measure the resonant frequency of the piezoelectric resonator. The network analyzer is also connected to a computer 352 through an interface 354. In some examples, the interface can be a general purpose interface bus (GPIB) or any other interface that allows the network analyzer to connect to a computer. In another particular example, the computer can run software for outputting data from the network analyzer, such as LabVIEW™ from National Instruments.

Another example frequency based biosensor 300 is shown in FIG. 3B. This biosensor includes an excitation transducer 316 and a receiving transducer 318 on the surface of a piezoelectric resonator 302. In this particular example, the excitation transducer and the receiving transducer are interdigital transducers, which each include two interdigitated electrodes. The frequency of the transducer can be designed by adjusting the distance between interdigitated electrodes. The excitation transducer can generate surface acoustic waves in one part of the piezoelectric resonator via a voltage source 306. The surface acoustic waves can travel across the surface of the piezoelectric resonator to the receiving transducer. The receiving transducer can convert the surface acoustic waves back into electrical signals via receiver 308. The transducers can be connected to a network analyzer as described above to send and receive electrical signals to and from the transducers. The biosensor also includes a sensor surface 310 between the excitation and receiving transducers. The sensor surface can be modified with aptamers 320 so that target viruses can bind on the sensor surface. In this example, a metal layer 312 is formed on the sensor surface to allow the aptamers to bond to the metal layer. When viruses bind to the aptamers on the sensor surface, the surface acoustic waves can be modified compared to when the sensor surface does not contain viruses. Therefore, the presence of the target virus can be detected by measuring the surface acoustic waves at the receiving transducer. FIGS. 3C, 3D, and 3E show side views of the biosensor with conceptual frequency waves travelling across the surface after virus 314 is bound to at least some of the aptamers 320. This view shows the fingers of the interdigital transducers 316 and 318 on either side of the sensor surface 310. The excitation transducer generates surface acoustic waves 304 that travel across the sensor surface, through the area where aptamers 320 are attached. FIG. 3C shows the surface acoustic wave forming at the excitation transducer. FIG. 3D then shows the surface acoustic wave travelling across the sensor surface. FIG. 3E shows the surface acoustic wave being received by the receiving transducer. Thus, when viruses are present on this surface, the viruses can interact with the mechanical surface acoustic waves as the waves travel across the sensor surface.

Figure 3F:
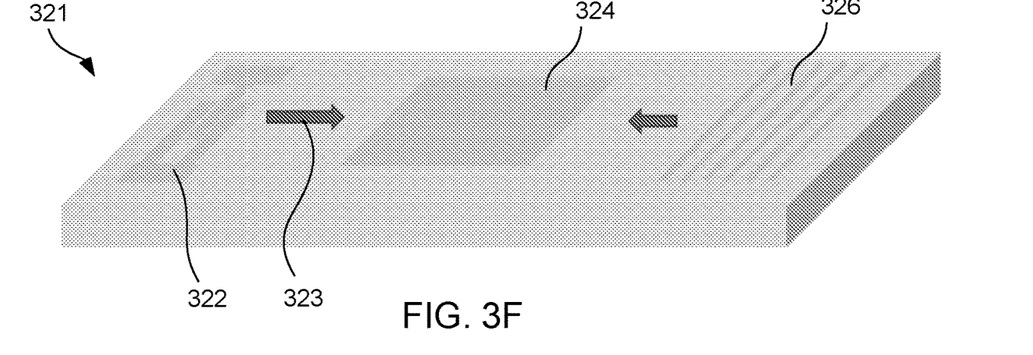
FIG. 3F is a schematic of a surface acoustic wave resonator biosensor using a reflector in accordance with an example of the present disclosure.

FIG. 3F illustrates another variation in which surface acoustic waves are transmitted and received by a common interdigital transducer to form a frequency based biosensor 321. Specifically, an interdigital transducer 322 can produce surface waves 323 which traverse across a sensor surface 324 to reach a reflector 326 opposite the sensor surface. Reflected waves traverse back across the sensor surface and are detected at the interdigital transducer 322. The sensor surface can also be functionalized with molecular recognition groups as discussed previously. Notably, the reflector can be any discontinuity along the surface which at least partially reflects surface acoustic waves. For example, electrically conductive, ceramic, polymer or other features can be deposited on the surface. Alternatively, features may be integrally formed in the substrate. Regardless, surface discontinuities can act as reflectors of surface acoustic waves.

Figure 3G:
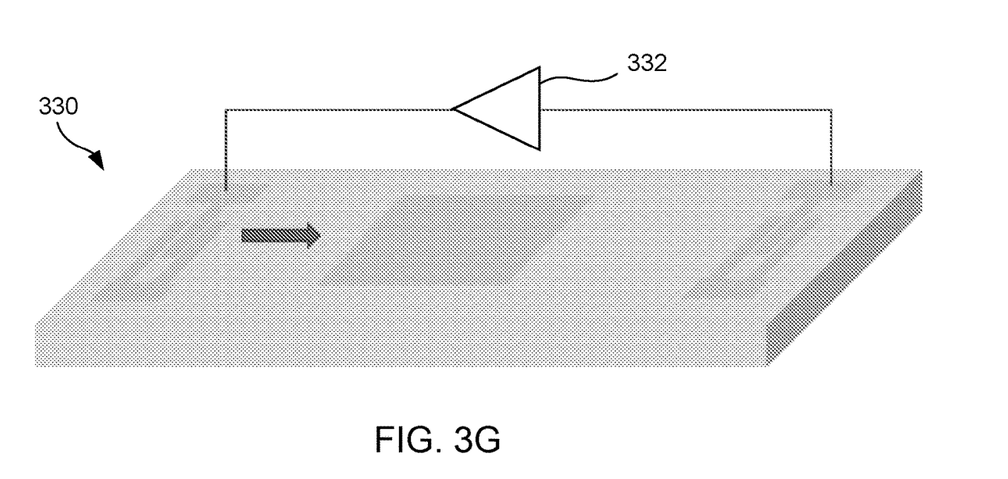
FIG. 3G is a schematic of a surface acoustic wave resonator biosensor using an amplifier in accordance with an example of the present disclosure.

FIG. 3G illustrates another variation of a frequency based biosensor 330 having an amplifier 332. This biosensor is similar to the biosensor illustrated in FIGS. 3C-3E with an amplifier circuit added. By adding an amplifier 332, the sensor operates as a self-oscillating device in which its resonant frequency is measured to detect presence of a viral biomolecule.

Figure 3H:
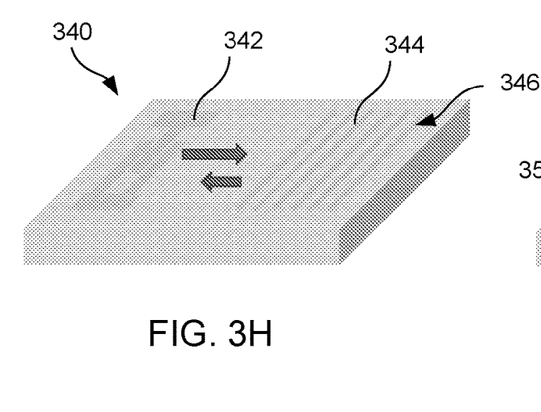
FIG. 3H is a schematic of a surface acoustic wave resonator biosensor using a reflector as a sensor surface in accordance with an example of the present disclosure.

FIG. 3H illustrates yet another variation of a frequency based biosensor 340 similar to that of FIG. 3F. In this case, the interdigital transducer 342 produces surface waves which travel across the piezoelectric material to a reflector 344. In this case, the sensor surface 346 is the surfaces of the reflector 344.

Figure 3I:
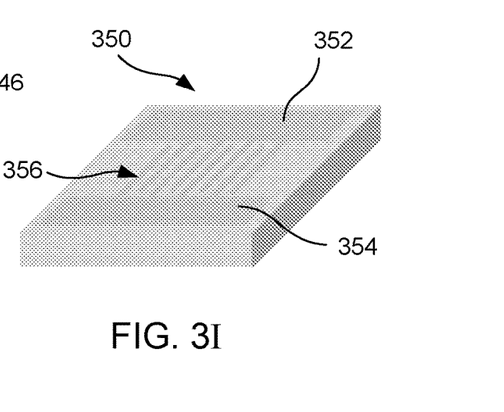
FIG. 3I is a schematic of a surface acoustic wave resonator biosensor using surfaces of an IDT as a sensor surface in accordance with an example of the present disclosure.

FIG. 3I illustrates still another variation of a frequency based biosensor 350 in which opposing interdigitated electrodes 352 and 354 operate to generate and receive surface acoustic waves. In this case, surfaces of the interdigital transducer electrodes also act as the sensor surface 356 to which molecular recognition groups can be attached.

In yet another alternative, the resonator can be a suspended piezoelectric beam with the sensor surface on at least a portion of the suspended piezoelectric beam. As previously described, the sensor surface can include molecular recognition groups which selectively bind with the viral molecule. In this case, the piezoelectric beam can vibrate at a desired frequency based on a corresponding electrical frequency input. The response resonant frequency of the suspended piezoelectric beam will change depending on whether viral biomolecule is attached to the molecular recognition groups due to the increased mass loading on the beam, e.g. a microelectromechanical microbalance resonator sensor.

The beams can be suspended at one or both ends. These beams can be formed of any suitable piezoelectric material such as, but not limited to, lead zirconate titanate, barium titanate, lead titanate, gallium nitride, zinc oxide, piezoelectric polymers (e.g. polyvinylidene difluoride, etc), composites thereof, and the like. Suitable electric contacts and current can be provided by corresponding AC power source which produces a desired input frequency.

Figure 4A:
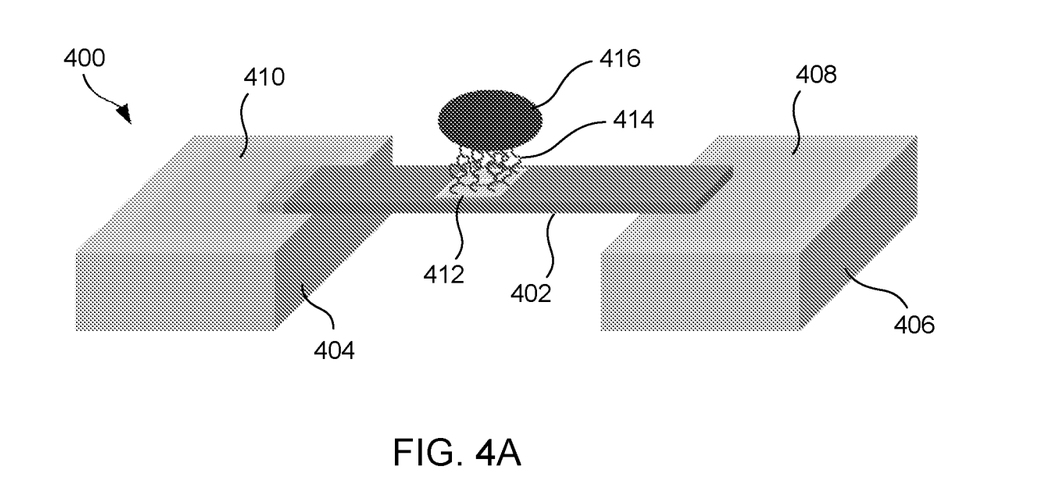
FIG. 4A is a schematic of a suspended bridge piezoelectric microelectromechanical microbalance resonator biosensor in accordance with another example.

FIG. 4A illustrates an example of a suspended bridge piezoelectric beam resonant sensor 400. A piezoelectric beam 402 can be supported and suspended between two spaced apart supports 404,406. Suitable conductive contact pads 408, 410 can be oriented at either end of the supported beam 402 to allow electric current to pass across the beam. A sensor substrate 412 can be oriented along a top surface of the beam. The sensor surface can occupy a portion (as illustrated) or the entire top surface of the beam. Regardless, the sensor surface can further include molecular recognition groups 414 (e.g. aptamers) which selectively bind with a virus 416 or other viral biomolecule.

Figure 4B:
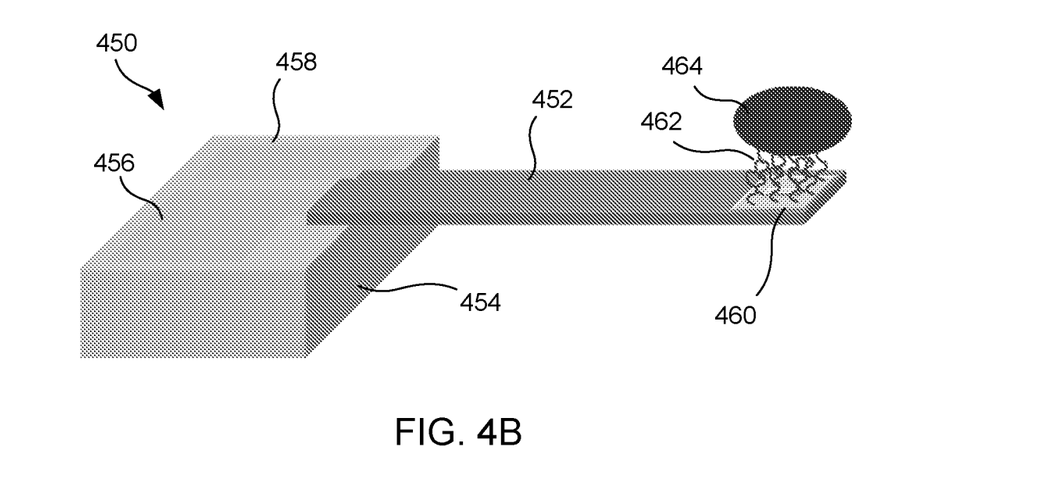
FIG. 4B is a schematic of a cantilevered beam piezoelectric microelectromechanical microbalance resonator biosensor in accordance with another example.

FIG. 4B illustrates an example of a suspended bridge piezoelectric beam resonant sensor 450. A piezoelectric beam 452 can be supported at one end from a support 454. Suitable conductive contact pads 456, 458 can be oriented to contact the beam to allow electric current to pass across the beam. A sensor substrate 460 can be oriented along a top surface of the beam. The sensor surface can occupy a portion (as illustrated) or the entire top surface of the beam. In this example, the sensor surface can be oriented at a distal end of the cantilevered piezoelectric beam, although other locations can be suitable. Regardless, the sensor surface can further include molecular recognition groups 462 (e.g. aptamers) which selectively bind with a virus 464 or other viral biomolecule.

It is to be understood that the above-referenced arrangements are illustrative of the application for the principles of the present invention. Thus, while the present invention has been described above in connection with the exemplary embodiments, numerous modifications and alternative arrangements can be made without departing from the principles and concepts of the invention as set forth in the claims.

Example—Detecting Zika Virus Through Resonant Frequency

A biosensor was assembled to demonstrate the detection of Zika virus by measuring a change in resonant frequency of a piezoelectric resonator. The piezoelectric resonator used in this example was made of lithium niobate (LiNbO$_3$). The lithium niobate resonator was extracted from a commercially available communication filter. The lithium niobate resonator had a clean resonant frequency at about 433 MHz. For comparison, similar sensors were build using quartz crystal resonators having resonant frequencies at 5 MHz and 10 MHz. The resonators were coated with gold and then pretreated by rinsing with acetone, ethanol, and deionized water. The resonators were then dried under a nitrogen stream to remove any contaminants from the surface. The resonant frequencies of the resonators were measured using an Agilent™ 4395A Network Analyzer from Agilent (USA). The network analyzer was connected to a computer running a modified version of Lab VIEW software which extracts the resonant frequency from spectrum data.

The resonators were then coated with aptamers that bind specifically to the SF9 envelope protein of the Zika virus. Other aptamers can be used to detect and sense other viruses and pathogens.

An amount of 2 microliters of the 1 micromolar aptamer solution were dropped onto the surface of the resonators. The resonators with the aptamer solution were then kept in a hydrate container at 80° C. for 10 minutes to allow aptamers to bond to the surface. The excess aptamers were then washed off by dipping in deionized water and the resonators were dried under nitrogen stream. The resonant frequencies of the resonators were measured five times. An additional 2 microliters of the aptamer solution was added and washed and dried, followed by measuring resonant frequency five times, and this process was repeated three times at different areas on the resonators.

After this, 2 microliters of stock inactivated Zika virus, and the Zika virus was allowed to bind with the aptamers for 5 minutes. The excess virus was then washed off by dipping in deionized water and drying under nitrogen stream. The resonant frequency was measured again. The Zika virus solution had a concentration of TCID50/mL titer, and the total number of Zika viruses in the 2 microliters of solution was about $3.5 \times 10^8$.

The spectrum and resonant frequency that were measured for the 5 MHz quartz resonator, the 10 MHz quartz resonator, and the 433 MHz lithium niobate resonator, are shown in FIGS. 9A, 9B, and 9C, respectively. The measurements were taken at IF bandwidth of 30 Hz with 800 points over a span of 800 Hz for the quartz resonators and 800 kHz for the lithium niobate resonator. In each case, the resonant frequency decreased when the virus was added.

Figure 5A:
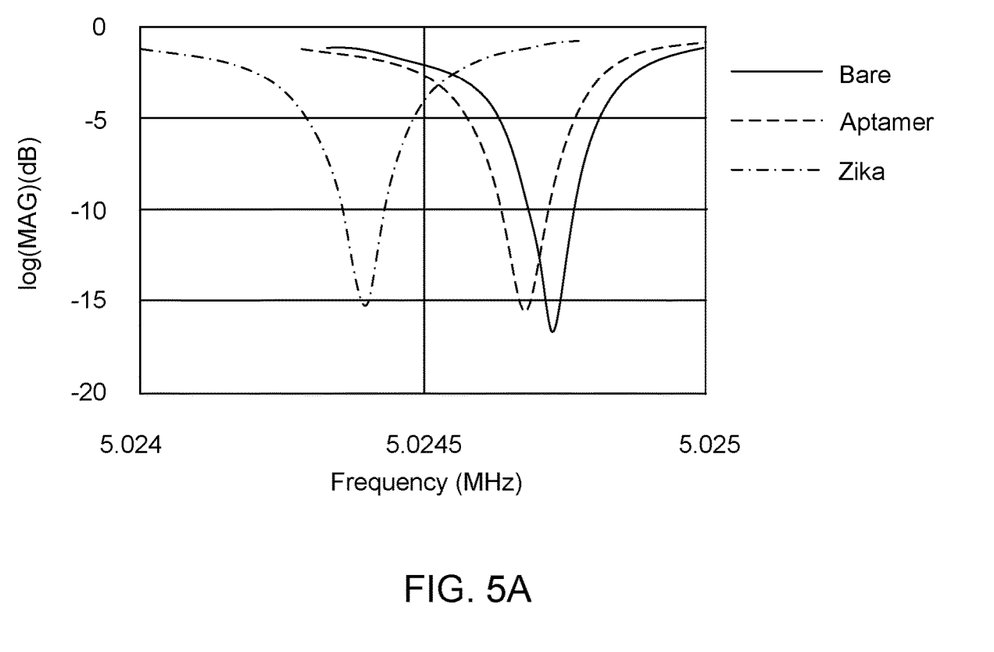
FIGS. 5A-5C are resonance spectra of example biosensors in accordance with examples of the present disclosure.
Figure 5B:
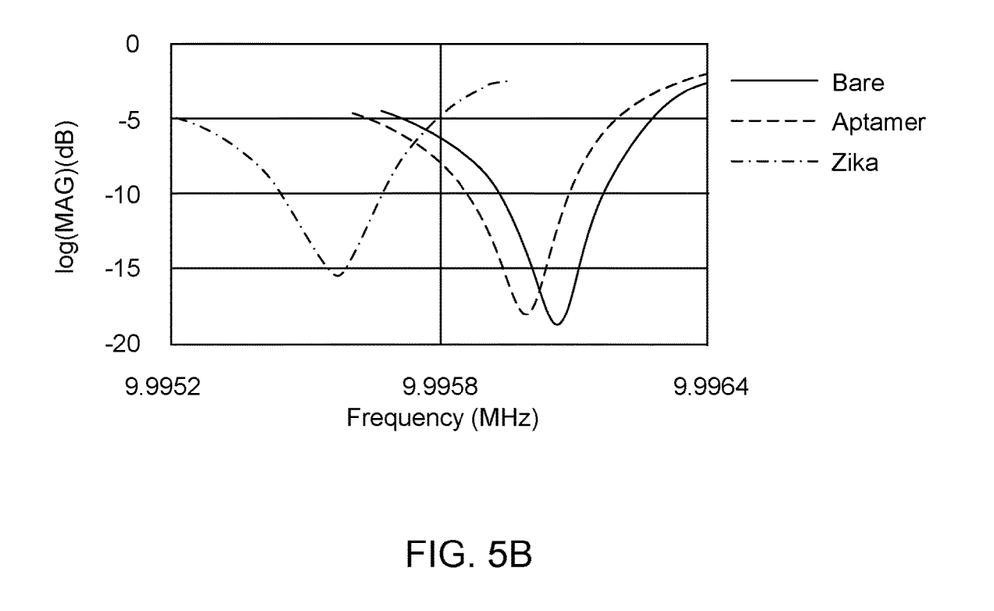
Figure 5C:
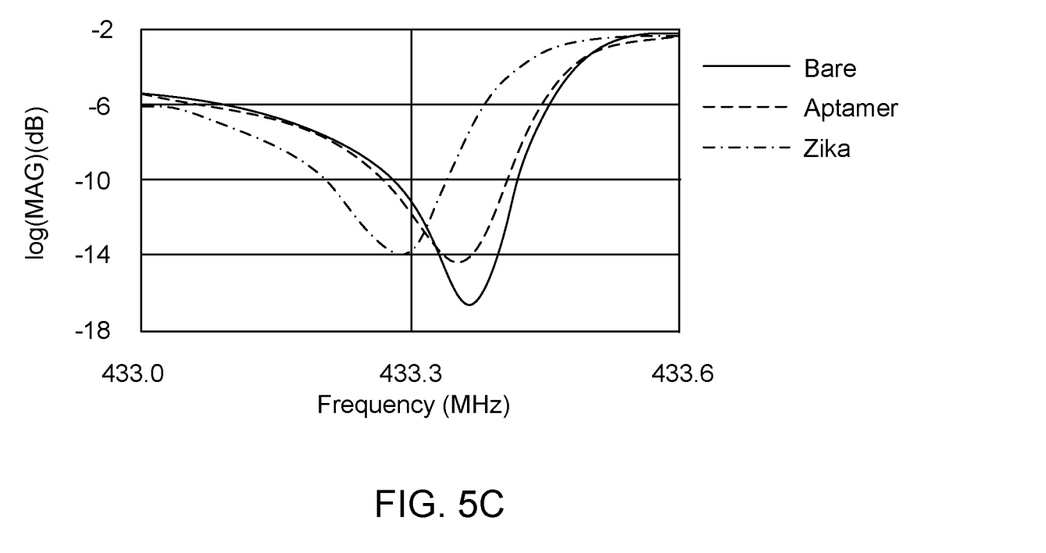
Figure 6A:
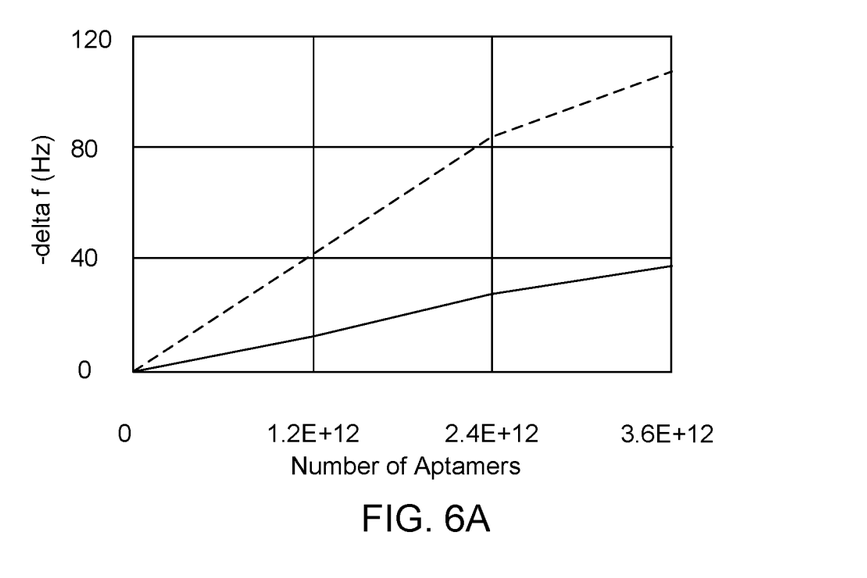
FIGS. 6A and 6B are graphs of the change in resonance frequency vs. amount of aptamer and virus for an biosensors in accordance with an example of the present disclosure.
Figure 6B:
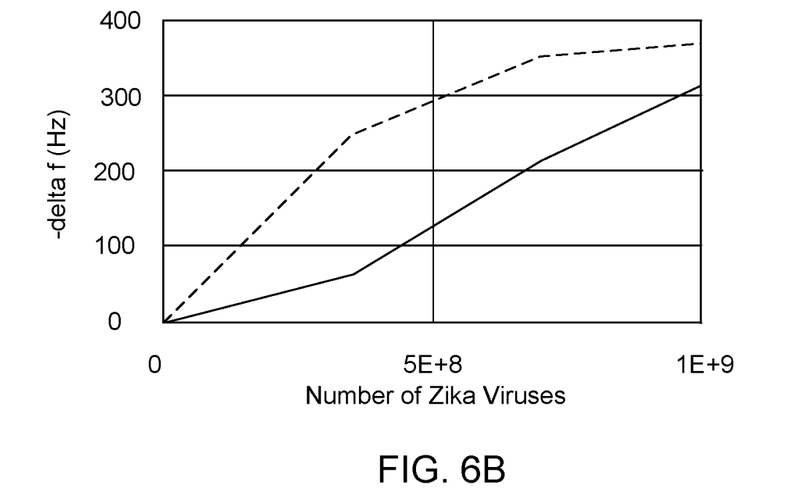
Figure 7A:
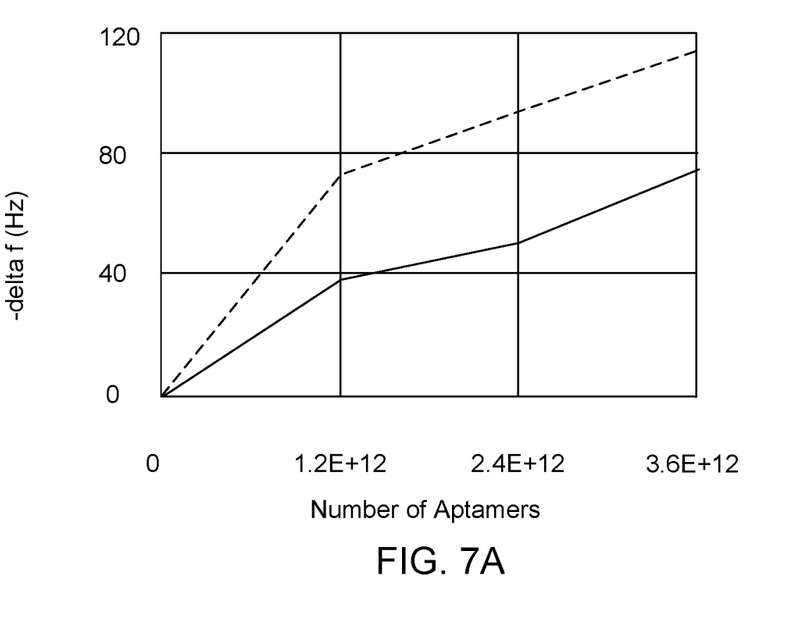
FIGS. 7A and 7B are graphs of the change in resonance frequency vs. amount of aptamer and virus for an biosensors in accordance with an example of the present disclosure.
Figure 7B:
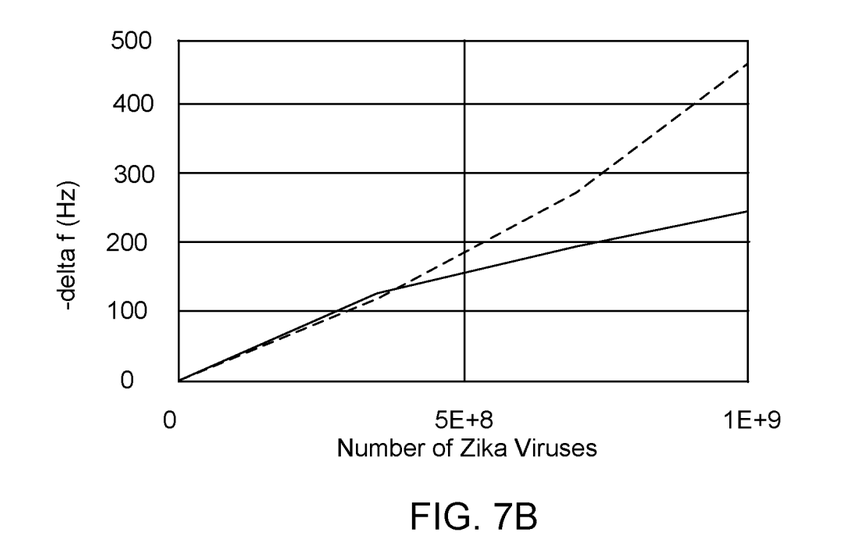
Figure 8A:
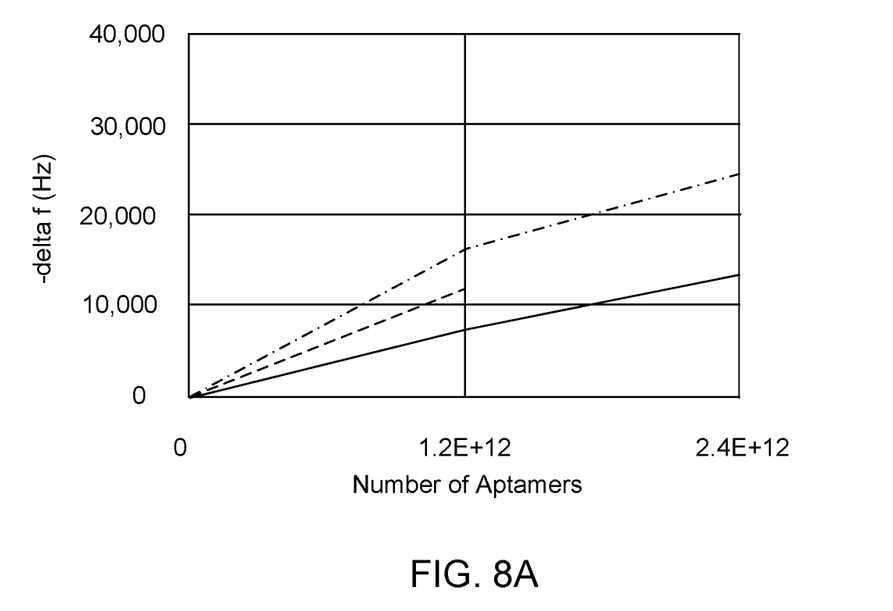
FIGS. 8A and 8B are graphs of the change in resonance frequency vs. amount of aptamer and virus for an biosensors in accordance with an example of the present disclosure.
Figure 8B:
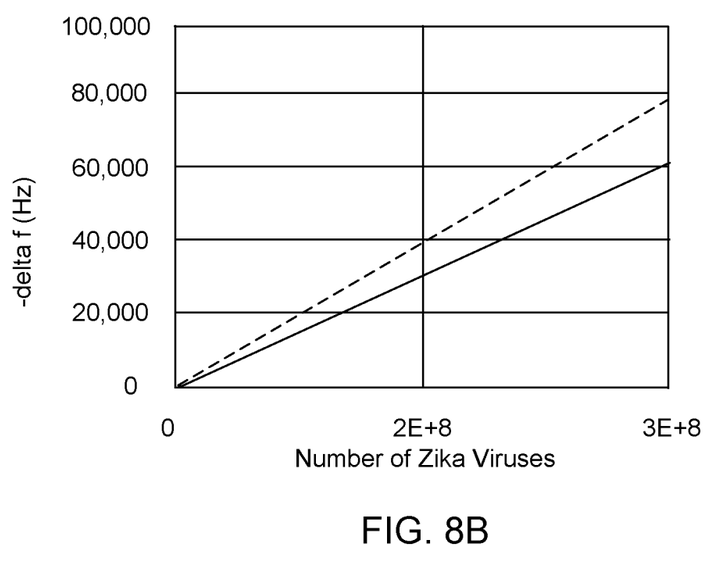

The addition of 2 microliters of Zika virus solution was also repeated three times for the quartz resonators. FIGS. 6A and 6B show the change in resonant frequency as a function of the amount of added aptamer (FIG. 6A) and Zika virus (FIG. 6B) for the 5 MHz resonators. Two similar resonators were prepared and tested for comparison. Both sample resonators had a larger change in resonant frequency with greater amounts of aptamer and Zika virus added. The y-axis of the graphs is the negative of the change in resonant frequency (−Δf) in units of Hz. The x-axis shows total number of aptamers or Zika viruses that were added to the surface of the resonators. Similar graphs are also included for the 10 MHz resonators (FIGS. 5A and 5B).

Three lithium niobate resonators were made and tested. The addition of aptamers was repeated once for two of the sample lithium niobate resonators. Zika virus was only added one time to two of the lithium niobate resonators. The change in resonant frequency with these additions of aptamer and Zika virus are shown in FIGS. 6A and 6B.

All of the sensors were able to detect the addition of Zika virus by exhibiting a reduction in the resonant frequency. However, the lithium niobate sensors were much more sensitive than the quartz sensors. The lithium niobate sensors had a sensitivity of about 370 Hz/ng of Zika virus. In comparison, the 5 MHz quartz sensor had a sensitivity of about 1 Hz/ng of Zika virus. Therefore, the lithium niobate sensor has a sensitivity around 400 times greater.

What is claimed is:

1. A method of detecting a virus, comprising:
exposing a sensor surface to a fluid sample containing a suspected virus, wherein the sensor surface is a surface of a resonator having a clean resonant frequency from about 1 MHz to about 1 GHz, wherein the surface is modified with molecular recognition groups selective for binding to a viral biomolecule;
measuring a resonant frequency of the resonator after exposing the sensor surface to the fluid sample;
comparing the measured resonant frequency with the clean resonant frequency indicating the presence of the viral biomolecule bound to the molecular recognition groups;
comparing the measured resonant frequency with a correlation of resonant frequency to mass of viral biomolecule bound to the molecular recognition groups; and
outputting a detection signal, wherein outputting a detection signal comprises outputting a calculated mass of viral biomolecule bound to the molecular recognition groups.

2. The method of claim 1, wherein the clean resonant frequency is from about 375 MHz to about 500 MHz.

3. The method of claim 1, wherein the clean resonant frequency is from about 430 MHz to about 440 MHz.

4. The method of claim 1, wherein the resonator is a piezoelectric resonator comprising lithium niobate (LiNbO$_3$) or quartz.

5. The method of claim 1, wherein resonator further comprises an interdigital transducer to produce resonance.

6. The method of claim 5, wherein the resonator further comprises a reflector.

7. The method of claim 1, wherein the resonator is a microelectromechanical resonator formed as a suspended beam.

8. The method of claim 1, wherein the viral biomolecule is a virus, the molecular recognition groups are aptamers, and the mass of virus bound to the aptamers is calculated with a sensitivity from about 200 Hz/ng of virus to about 600 Hz/ng of virus.

9. The method of claim 1, wherein the resonant frequency indicating the presence of the viral biomolecule bound to the molecular recognition groups is less than the clean resonant frequency.

10. The method of claim 1, wherein the molecular recognition groups are at least one of aptamers, antigens, and antibodies, and the viral biomolecules are at least one of virus, antibodies, antigens, viral proteins, viral RNA, viral DNA, and viral biomarkers.

11. The method of claim 10, wherein the molecular recognition groups are aptamers and the aptamers are covalently bonded to the sensor surface by reacting thiol groups of the aptamers with the surface.

12. The method of claim 11, wherein the sensor surface further comprises a metal layer over the resonator, wherein the aptamers are covalently bonded to the metal layer.

13. The method of claim 1, wherein the virus is ZIKA or SARS-COV-2.

14. A microbalance whole virus sensor, comprising:
a resonator having a sensor surface with a clean resonant frequency from 1 MHz to 1 GHz and the sensor surface including molecular recognition groups attached to the sensor surface, wherein the molecular recognition groups selectively bind with a viral biomolecule; and a processor which compares the clean resonant frequency to a measured resonant frequency when the viral biomolecule binds with the molecular recognition groups to identify presence of the viral biomolecule, wherein the processor further compares the measured resonant frequency with a correlation of resonant frequency to mass of viral biomolecule bound to the molecular recognition groups to output a calculated mass of viral biomolecule bound to the molecular recognition groups.

15. The microbalance whole virus sensor of claim 14, wherein the resonator is a piezoelectric resonator or a micro-electromechanical resonator.

16. The microbalance whole virus sensor of claim 14, wherein the resonator is a piezoelectric resonator comprising lithium niobate ($LiNbO_3$) or quartz.

17. The microbalance whole virus sensor of claim 14, wherein the clean resonant frequency is from about 375 MHz to about 500 MHz.

18. The microbalance whole virus sensor of claim 14, wherein the molecular recognition groups are at least one of aptamers, antigens, and antibodies, and the viral biomolecules are at least one of virus, antibodies, antigens, viral proteins, viral RNA, viral DNA, and viral biomarkers.

19. The microbalance whole virus sensor of claim 18, wherein the viral biomolecule is a ZIKA virus or SARS-COV-2 virus.

* * * * *